Dec. 15, 1959    R. HASTINGS, JR    2,917,196
MATERIALS HANDLING DEVICE

Filed Nov. 25, 1957    3 Sheets-Sheet 1

INVENTOR.
RUSSELL HASTINGS JR.
BY
ATTY.

Dec. 15, 1959 R. HASTINGS, JR 2,917,196
MATERIALS HANDLING DEVICE
Filed Nov. 25, 1957 3 Sheets-Sheet 2
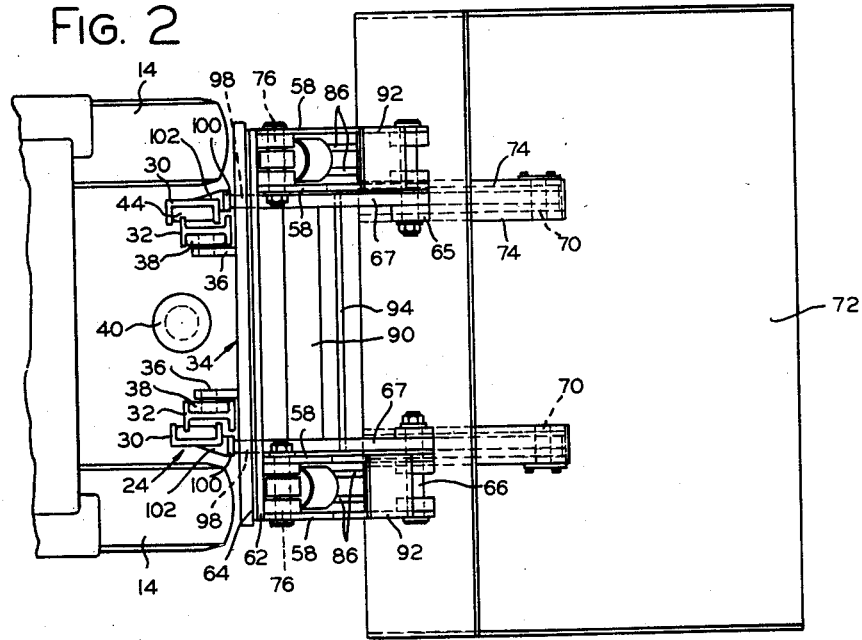
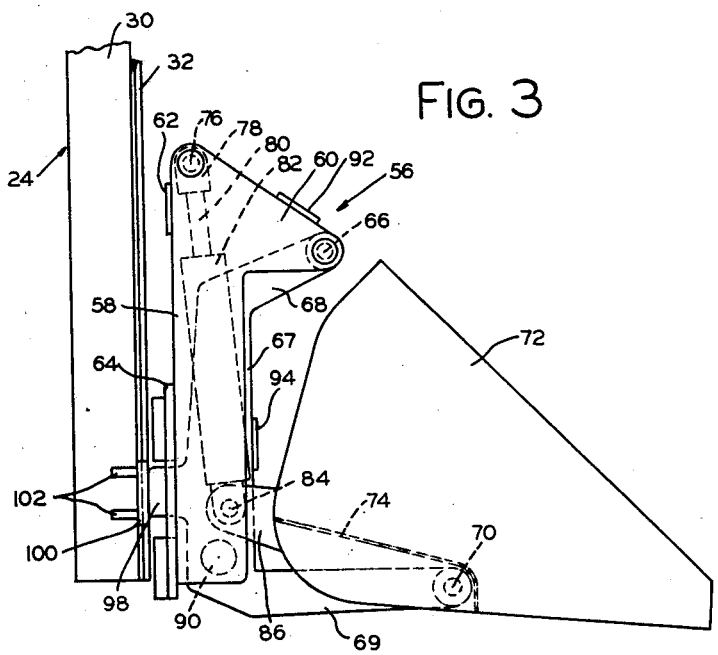
INVENTOR.
RUSSELL HASTINGS JR.
BY
ATTY.

Dec. 15, 1959     R. HASTINGS, JR     2,917,196
MATERIALS HANDLING DEVICE

Filed Nov. 25, 1957     3 Sheets-Sheet 3

INVENTOR.
RUSSELL HASTINGS JR.
BY J. Frederick Bechtel
ATTY.

United States Patent Office 2,917,196
Patented Dec. 15, 1959

2,917,196

MATERIALS HANDLING DEVICE

Russell Hastings, Jr., Battle Creek, Mich., assignor to Clark Equipment Company, a corporation of Michigan Application November 25, 1957, Serial No. 698,670

13 Claims. (Cl. 214—701)

This invention relates to a materials handling device and more particularly to a materials handling device which is particularly adapted for the handling of bulk materials and which may be adapted as an attachment for use with, for example, an industrial lift truck.

Materials handling devices of the general type contemplated have been used previously for the handling of such materials as earth, farm products, refuse of various kinds, and other types of bulk goods. Heretofore, however, there has not been available a material handling device constructed so that the loader end thereof, which is disclosed herein as a bucket or shovel, is positively and selectively actuatable about either one of two pivot means so that the bucket or shovel is first operable to positively dig out a full load of bulk material when pivoted in one direction (without any concurrent additional movement being imparted thereto), and is then available for unloading or dumping such bulk material when actuated about the other pivot means.

Previously, it has generally been necessary in the use of devices of the general type contemplated to impart motion substantially simultaneously in two directions to the bucket or shovel so as to insure the engagement of a full load of material thereby. That is to say, the loaders or buckets of many previous devices have been pivoted about the bottom side thereof so as to have a roll-back action during pivoting movement rather than a digging-in action. This has necessitated moving the bucket forwardly concurrently with rotation thereof to insure engaging a full load. When such devices are used with industrial trucks it is necessary for the driver to continue to propel the truck forwardly toward a pile of bulk material simultaneously with rolling back the bucket away from the material about a lower pivot. Such an arrangement limits substantially the amount of force that can be exerted toward the pile when driving the truck in a forward direction since the maximum traction of the drive wheels is limited as functions of the composition of the support therefor, as concrete floor or earth, and of the maximum torque of the prime mover.

I have found that by pivoting such a bucket about a relatively raised pivot, it will have a digging-in action instead of a roll-back action so that a truck may first be driven into a pile of earth, for example, and the bucket then pivoted outwardly and upwardly to engage a full load without further forward movement of the truck. In this latter arrangement, the truck may be braked to resist the reactive force of the digging-in action, and may be thereby made capable of resisting a reaction of approximately twice that which it could resist if forward motion of the truck were necessary concurrent with rotation of the bucket in order to engage a full load in the bucket.

In addition, I have provided the second pivot means located below the first pivot means and about which the bucket may be positively actuated to dump or disengage a load. This arrangement affords additional advantages over prior devices of a similar type, as will appear hereinafter.

It is a primary object of my invention to provide a materials handling device which is selectively actuatable about either one of two vertically spaced pivot means such that movement about the upper pivot means effects a digging-in action and movement about the lower pivot means effects a discharging or dumping action.

It is another object of my invention to provide a bulk loader device for vehicles wherein the reaction resulting from a digging-in or loading action of the device is resisted directly by frame members of the vehicle.

It is a further object of my invention to provide a materials handling device particularly adapted for the handling of bulk materials and so constructed and arranged as to obtain substantially maximum effectiveness of loading and unloading operations in a substantially minimum volume of space.

Other objects and advantages of the present invention will become apparent from the following description.

In carrying out my invention I provide a materials handling member, such as a bucket or shovel, which is pivotally attached adjacent the lower surface thereof to an upwardly and forwardly extending arm member. The arm member is pivotally secured adjacent its upper end to other arm means which includes an upwardly extending portion and which is secured to support means. Pivotally secured to the support means and to the bucket is a double-acting hydraulic cylinder and piston assembly which is energizable in one direction for rotating the bucket to a discharge position about its lower pivoted connection to the arm member and in the other direction for rotating the bucket with the arm member about the upper pivoted connection thereof with the other arm means.

In the drawings:

Figure 2 is a plan view of the device of this invention and, as illustrated, is connected to the telescoping upright of the truck of Figure 1;

Figure 3 is a side view in elevation of the structure shown in Figure 1, and wherein the manner of connecting the upright portion to the frame of the industrial truck is schematically illustrated;

Figure 1:
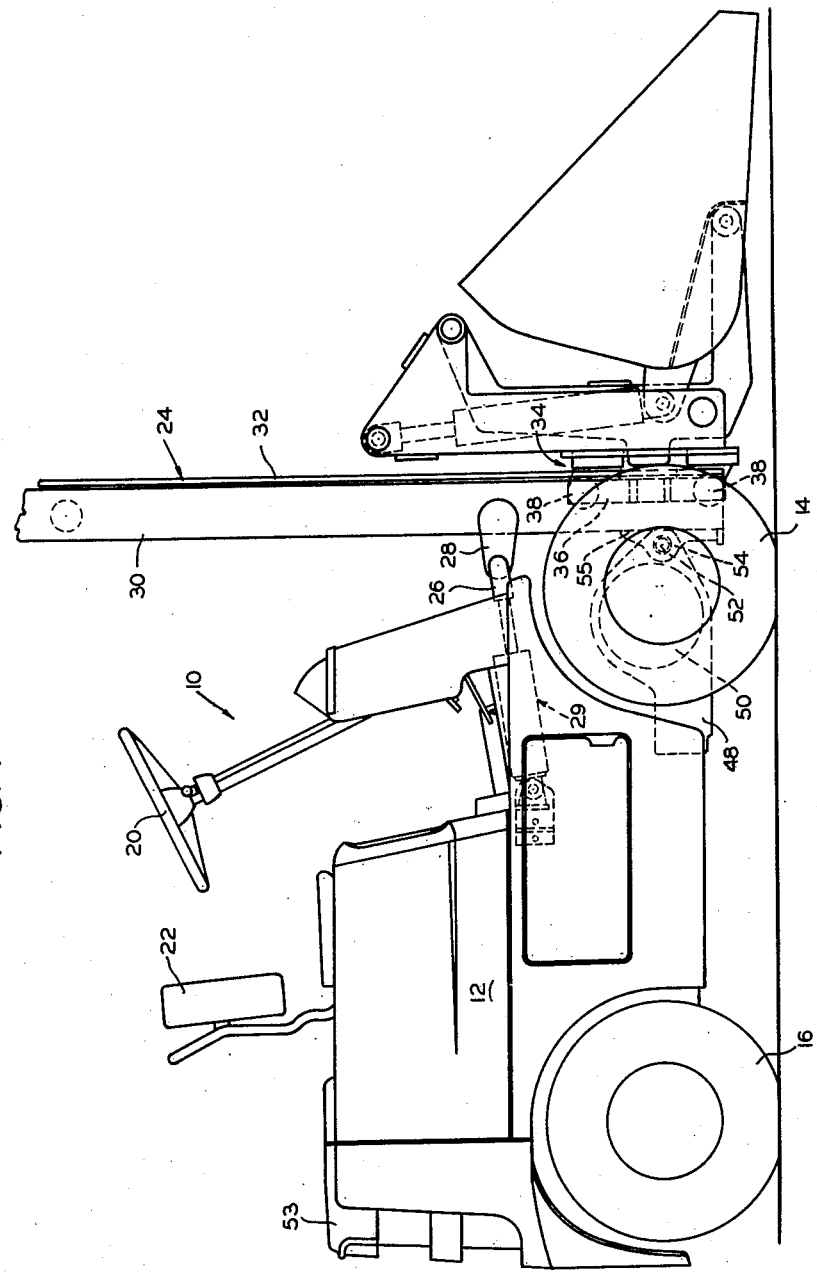
Figure 1 is a perspective view showing the device of this invention associated with an industrial truck.

Referring now to Figure 1, the numeral 10 indicates generally an industrial lift truck. This vehicle includes a body portion 12 which is mounted on four wheels in the usual manner. In the industrial truck illustrated, the front wheels 14 are drive wheels and are operated by prime mover means such as an internal combustion engine located within body portion 12. The rear wheels 16 (only one of which is visible) are dirigible wheels and are connected to an operator's steering wheel 20 by means of a conventional linkage for steering the vehicle. The operator's station of which the steering wheel 20 is a part includes also a seat 22.

At the front end of the body portion of the truck is located a vertically disposed telescopic mast structure indicated generally by the numeral 24. This mast is pivotally mounted adjacent its lower end to the body portion of the truck and is arranged to be tilted forwardly and rearwardly by conventional means, including a link and bracket 26 and 28, connected between truck mounted hydraulic cylinder means 29 and the mast structure 24 at each side thereof. The mast structure 24 comprises an outer guideway formed by a pair of channel members 30 and an inner slide member 32 which includes a pair of laterally spaced I-beam members in telescopic and overlapping relation to the channel members 30, as best shown in Figure 2.

A load supporting carriage 34 is supported upon the I-beam members by means of a pair of laterally spaced fork bracket members 36 having a pair of vertically spaced roller means at the after end of each thereof. The I-beam members comprising the inner slide member 32 may be raised and lowered as a unit in a conventional manner by an hydraulic motor 40 which includes an outer cylinder and an inner piston arranged to raise and lower the carriage through a chain and chain support means (not shown). The I-beams comprising the inner slide members 32 are maintained in the relative positions shown in Figure 1 by means of a plurality of roller means 44 which are connected to and between the channel members 30 and the inner slide 32.

The hydraulic motor means 40 (together with the chain and chain support means) is operable to raise and lower the carriage relative to the inner slide 32, and also the inner slide 32 relative to the channel members 30 in a well known manner.

To a pair of laterally spaced truck frame members 48 (one of which is shown in Figure 1) is mounted a drive axle housing 50 of the wheels 14. Adjacent the forward ends of the frame members 48 is located a transversely extending pivot shaft 52 upon which is mounted for pivotal movement therewith a pair of laterally spaced brackets 54 (one of which is shown in Figure 1) which are secured along margin 55 to the rear flange portions of the channel members 30.

The mast structure per se forms no part of the present invention and is fully disclosed in the copending U.S. application, Ser. No. 589,156, of Hastings and Beckofen, filed June 4, 1956 (common assignee).

The truck 10 also includes at the rear end thereof a counterweight 53 which ordinarily is made of metal, it being secured to the rear end of the truck to counterbalance in a well known manner the loads which are carired at the front end thereof.

Secured to the carriage 34 is the materials handling device of my invention, generally indicated at numeral 56. This device is movable vertically with the carriage 34 on the mast structure 24. The device includes, in the preferred embodiment thereof which is illustrated, two pairs of laterally spaced and generally upwardly extending frame members 58, each of which includes a forwardly extending nose portion 60. The frame members 58 are maintained in fixed spaced relationship by means of laterally extending and vertically spaced members 62 and 64 which are secured adjacent the opposite end portions thereof to each pair of frame members 58. A transversely extending trunnion means 65, which includes a pivot shaft 66, is mounted adjacent the end of the nose portion 60 of each pair of frame members 58. Each pivot shaft 66 extends laterally inwardly a predetermined distance beyond the respective pair of frame members 58 toward the longitudinal axis of the device 56. A generally pivotally C-shaped cantilever arm member 67 is secured adjacent the outer end of an upper arm 68 thereof to the inward extension of each pivot shaft 66. Adjacent the outer end of the lower arm 69 of each arm member 67 is a trunnion means 70.

Figure 4:
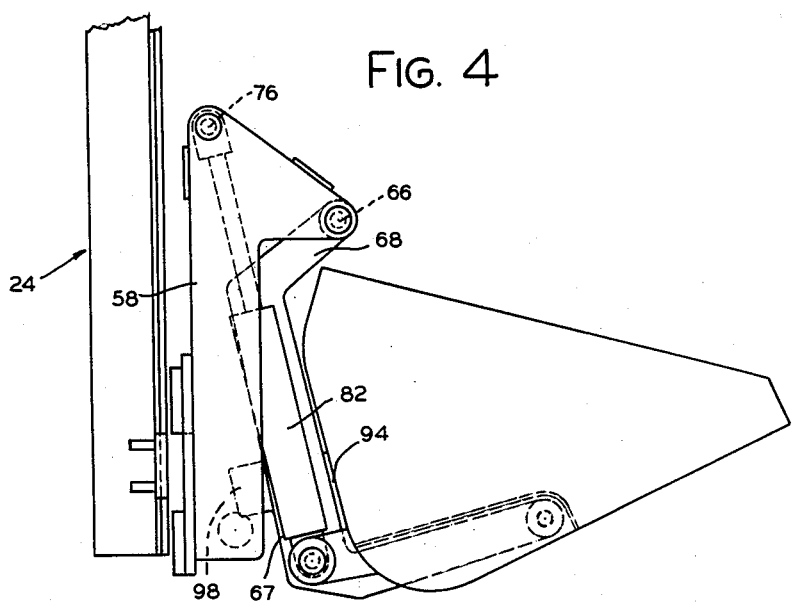
Figure 4 is a view similar to Figure 3 but illustrating the loader device of my invention in a partially upwardly rotated position, as during a loading operation.

A bucket or shovel member 72 is formed to efficiently handle bulk loads of various types as hereinbefore described. The bottom surface of the bucket 72 is formed to define a pair of longitudinally forwardly extending and laterally spaced pockets or channels 74 which terminate at the forward ends thereof in the center portion of the bucket. The pockets 74 are adapted for registry with the lower arms 69 of arm members 67, the C-shaped arm members being formed such that the bucket 72 may be nested within the portions thereof as shown in Figure 4. The bucket 72 is pivotally connected by means of trunnions 70 to the outer ends of the arm portions 69 adjacent the forward ends of the pockets 74.

A trunnion means 76 is mounted between each pair of frame members 58 adjacent the uppermost portion thereof. Pivotally connected to each trunnion member 76 is the outer end 78 of a piston rod 80 which is associated with a cylinder and piston assembly 82. The lower end of each cylinder is pivotally connected at 84 between a bifurcated rearwardly extending bracket 86 which is secured to the lower rear portion of opposite sides of the bucket adjacent the downwardly extending end of each cylinder of the assemblies 82.

Members for rigidifying and strengthening various portions of the over-all structure of the device include a transversely extending tubular member 90 which is secured at opposite ends thereof, as by welding, to the inner surfaces of the C-shaped arm members 67 adjacent the lower arms 69 thereof, a transversely extending plate member 92 secured to the upper edges of the nose portions 60 of each pair of frame members 58, and a transversely extending plate member 94 connected between the arms 67 at the forward side of the vertical portion thereof. The element 94 also functions as a stop member for the bucket 72 which pivots to its nested position within the arms 67 whereat the rear surface of the bucket abuts the element 94.

Each of the C-shaped arms 67 includes a rearwardly extending projection or abutment member 98 which is adapted to normally abut an adjacent member 100 which is secured to the lower portion of the forward flange of each of the channel members 30 of the mast 24 by means of a pair of vertically spaced gusset plates 102. The purpose of abutment members 98 and 100 will be described hereinafter.

In the operation of my device, when it is associated with an industrial truck as described herein, the truck 10 may be moved toward a pile of bulk material, such as earth, with the shovel 72 in the loading position shown in Figure 3 wherein cylinder and piston assemblies 82 have been pressurized at the piston rod ends so that the cylinders are actuated slightly upwardly from normal or neutral position, thereby effecting a slight clockwise rotation of the shovel 72 about trunnions 70 from its fully nested position in arms 67. It has been found that a clockwise rotation of the shovel of approximately 4° relative to the truck supporting surface is satisfactory for the primary digging-in-function of the shovel. The forward movement of the truck is continued until the shovel has been projected substantially fully into the material to be handled. It will be noted that the major portion of the rearward thrust resulting from the primary digging-in action is resisted directly by the main frame members 48 of the truck through channel members 30, abutting members 98, 100 and arm members 67. This arrangement is highly advantageous when the device is combined with an industrial truck inasmuch as it relieves the rollers which are connected to the carriage brackets 36 from being subjected to the digging-in thrust. With this device, arm members 67 by-pass, in effect, such thrust through the abutment members 98 and 100. As a result, the carriage rollers and I-beams of the mast need not be constructed to withstand high primary digging-in thrust.

After the shovel 72 has been projected into the material a desired amount the brakes of the vehicle may be set and the cylinder means 82 pressurized to extend the cylinders 82 relative to the piston rods 80, which action first effects a counterclockwise rotation of the shovel about trunnions 70 until it is nested fully within the arms 67; further extension of the cylinders as aforesaid functions, through the moment arms between trunnions 84 and 66, to rotate the shovel 72 and arms 67 together about the trunnions 66, as shown in Figure 4. As the shovel and arm members are rotated together, it is apparent that the forward transverse lip of the shovel describes an outwardly and upwardly directed arc which effects a continuous secondary digging-in action as this phase of shovel movement progresses, thereby insuring that a full load will be engaged by the shovel.

It is important to note in this regard that in order to obtain a full bucket load it is not necessary to continue to move the truck forwardly into the material while rotating the bucket in a counterclockwise direction. With the brakes of the vehicle set, therefore, it will be seen that a given truck which has, say, a forward propelling or tractive force of only 2,000# may be able to resist a backward reaction of 3,000 or 4,000#. It has been necessary in the use of previous shovel attachments for industrial trucks which have not utilized this secondary digging-in action to continue forward movement of the truck while rotating the shovel in order to insure a full load. With my device, more work can be done in a given time with a smaller truck than heretofore because of the unique construction of the device as herein described. It will also be noted that available backward tilt of the mast assembly 24 about pivot shaft 52 is added to the maximum angle of rotation of the bucket about trunnions 66 to effect a relatively high total angle of tilt. This manner of adding the angles of tilt of the mast assembly and bucket is important since the design of the device 56 is thereby simplified.

Following engagement of a full load of material by the bucket, the device 56 may be hoisted on the mast assembly 24 with the carriage member 34 to a desired elevation while remaining in the position illustrated in Figure 4 to insure no loss of load. The truck may then be driven to a desired location for dumping the load at which the cylinder assemblies 82 are pressurized to actuate the cylinder to a full retracted position as shown in Figure 5.

When the cylinders are first pressurized for retraction thereof it will be apparent that the bucket will first be rotated in a clockwise direction about its trunnions 70 concurrently with like rotation of arm members 67 about trunnions 66. The rotation of arms 67 from the position shown in Figure 4 to that of Figure 5 results, of course, from the shortening of cylinder assemblies 82 and the effect of the bucket load. After the abutment members 98 and 100 are again in contact continued retraction of the cylinders effects continued rotation of the bucket only about trunnions 70. The mast assembly 24 can be tilted forwardly about its connections 52 with the truck frame members to increase the total available forward angle of tilt of the bucket.

Figure 5:
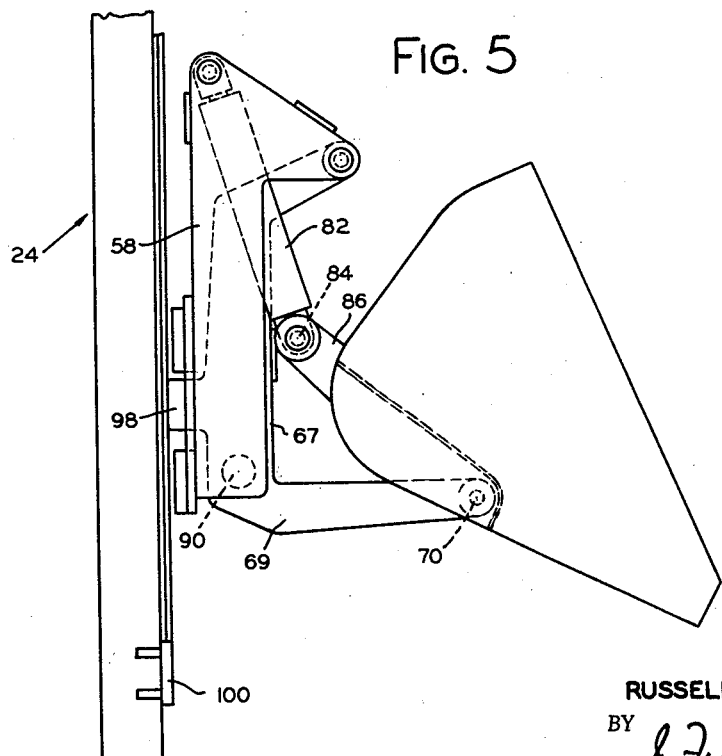
Figure 5 illustrates the device elevated on the upright and in an unloading or dumping position.

In addition to the compactness of structure which is facilitated by my construction and the secondary digging-in action of the bucket afforded by upward rotation thereof about trunnions 66, my construction also affords substantial reach-out of the bucket forward of the mast assembly when it is rotated to the dump position shown in Figure 5. This reach-out is important since it insures that the device can be utilized, for example, in loading bins of various sizes wherein the bucket can be dumped at a distance from the upright assembly which is adequate to reach the center portion of a rather large bin.

From the above it will be now understood that the particular manner in which dual pivot means have been utilized in a device of the above described character assures a variety of advantages over single pivot devices as heretofore used. It will also be apparent that while this device has been described in relation to its use with an industrial truck, such association is for illustrative purposes only and that persons skilled in the art may make design modifications and rearrange the parts of the device to adapt it for use with other types of vehicles without departing from the scope of the invention as defined in the claims appended.

I claim:

1. In combination, a vertically extending frame means, means for actuating said frame means in vertical guided movement, pivot means located in the upper portion of the frame means, a rigid arm means connected to and depending downwardly from the pivot means for pivotal movement relative to the frame means, said arm means including a forwardly projecting portion adjacent the lower end thereof, a materials handling means pivotally connected to the forwardly projecting portion of said arm means, motor means pivotally connected to said materials handling means and to said frame means for selectively and positively rotating the materials handling means and arm means together about said first mentioned pivot means and for rotating said materials handling means about its pivoted connection with said arm means and stop means limiting rotation in one direction of said materials handling means relative to said arm means.

2. In combination, a normally vertically extending frame means, support means for said frame means, rigid arm means pivotally connected to and depending downwardly from an elevated portion of the frame means, materials handling means pivotally connected to a forwardly projecting lower portion of the arm means, a hydraulic motor connected to said frame means and to said materials handling means for pivoting said materials handling means in either direction with said arm means about said first mentioned pivot connection and for imparting additional pivotal movement of said materials handling means in either direction about said second mentioned pivot connection, and stop means limiting rotation in one direction of said materials handling means relative to said arm means.

3. In combination, support means, upwardly extending frame means connected to the support means, downwardly depending rigid arm means pivotally connected to the upper portion of the frame means, a bucket member secured to the lower portion of the arm means for pivotal movement only relative to the arm means, stop means limiting rotation of said bucket member relative to said arm means, and motor means connected to the frame means and to the bucket member for imparting rotational movement to the bucket member and arm means together about the pivot connection for effecting an outward arcuate movement of the forward edge of the bucket member during digging-in movement thereof, said arm means including abutment means thereon engageable with the support means for resisting the reaction force of such digging-in action.

4. A bulk materials handling device comprising support means, an upwardly extending frame connected to the support means, a generally C-shaped rigid arm means pivotally connected to and depending downwardly from the upper portion of the frame, loader means pivotally connected to the outer portion of the lower arm of said C-shaped arm means, stop means limiting rotation of said loader means relative to said arm means, and motor means operatively connected to the loader means and to the upper portion of said C-shaped arm means for selectively actuating said loader means pivotally about either of said pivot connections.

5. A materials handling device comprising an upwardly extending frame means which includes a forwardly extending nose portion adjacent the upper end thereof, a downwardly depending rigid C-shaped arm means pivotally connected to the nose portion of said frame means, a materials handling means pivotally connected adjacent the forward end of the lower forwardly extending portion of said C-shaped means, motor means connected to said materials handling means and to said frame means for selectively actuating said materials handling means and said C-shaped arm means in either direction about said first mentioned pivot connection and said materials handling means alone in either direction about said second pivot connection, and stop means limiting rotation in one direction of said materials handling means relative to said arm means.

6. A device comprising a downwardly depending arm means having first and second pivot means associated therewith in vertically spaced relation, the first pivot means being connected with a support member for permitting rotation of the arm means with respect thereto, a materials handling member pivotally connected to the second pivot means, a hydraulic motor connected to the materials handling member for selectively rotating same with the arm means in either direction about the first pivot means and for selectively rotating the materials handling member alone in either direction about the second pivot means, and stop means limiting rotation in one direction of said materials handling member relative to said arm means.

7. In an industrial lift truck having a mast assembly pivotable adjacent the lower end thereof in relation to the truck, a materials handling attachment therefor comprising carriage means for raising and lowering movement relative to the mast assembly, an upwardly extending frame means supported by said carriage, an arm means pivotally connected to the upper portion of the frame means and depending downwardly therefrom and including a forwardly projecting portion at the lower end thereof, a materials handling member pivotally secured adjacent the outer end of said forwardly projecting portion, motor means connected to the materials handling member and to the frame means for selectively actuating said materials handling member in rotation in either direction about a selected one of said pivot connections, and stop means limiting rotation in one direction of said materials handling member relative to said arm means.

8. An attachment as claimed in claim 7 wherein said frame means includes a rearwardly projecting member abuttable with a portion of said mast assembly for directing rearwardly directed forces directly onto said mast assembly.

9. In an industrial lift truck having a mast assembly adjacent the forward end thereof, a bulk material handling attachment comprising an upwardly extending frame means supported on said mast assembly and including a forwardly directed nose portion, a generally C-shaped arm means pivotally connected adjacent the upper arm portion thereof to said nose portion, a bucket pivotally connected to the lower arm portion of said arm means, motor means connected to said bucket for selectively rotating same in either direction about one or the other of said pivot connections, and stop means limiting rotation in one direction of said materials handling bucket relative to said arm means.

10. A device comprising a pair of laterally spaced frame means having forwardly extending nose portions adjacent the upper ends thereof, a pair of laterally spaced generally C-shaped arm means pivotally connected to respective ones of said pair of frame means inwardly thereof and depending downwardly therefrom, said pivot connections being located in said nose portions of said frame means and in the upper arm portions of said arm members, a materials handling member pivotally connected to said pair of arm means adjacent the outer ends of the lower arm portions of the arm means, motor means connected to said materials handling member for effecting rotation thereof with said pair of arm means about the pivoted connection thereof with said pair of frame means and about said pivoted connection with said pair of arm means, and stop means limiting rotation in one direction of said materials handling member relative to said arm means.

11. A device as claimed in claim 10 wherein said motor means comprises a pair of hydraulic cylinder and piston assemblies, each of which assemblies is connected at one end to said materials handling member and at the other end to one of frame means for rotating the materials handling member and said pair of C-shaped arm means together in either direction about the first mentioned pivot means and for also rotating the materials handling member alone in either direction about the second mentioned pivot means.

12. A device as claimed in claim 11 wherein said materials handling member is nestable within the C-shaped arm means and is rotatable upwardly with said arm means about said first mentioned pivot means and is rotatable downwardly out of nested relation with said C-shaped arm means about said second mentioned pivot means.

13. A materials handling device comprising upwardly extending frame means, downwardly depending means pivotally connected to the frame means, a materials handling member pivotally connected to the downwardly depending means, a motor for selectively actuating the materials handling member in either direction about either of the pivot connections, said motor being pivotally connected to said frame means at one end thereof and to said materials handling member at the other end thereof and being selectively controllable to actuate said materials handling member and downwardly depending means together about said first mentioned pivot connection for loading bulk material into the materials handling member and to actuate said material handling member alone about said second mentioned pivot connection for unloading bulk material therefrom, and stop means limiting rotation in one direction of said materials handling member relative to said downwardly depending means.

References Cited in the file of this patent

UNITED STATES PATENTS 2,548,084    Wagner _____ Apr. 10, 1951